(12) United States Patent  
Ito

(10) Patent No.: US 9,755,218 B2  
(45) Date of Patent: Sep. 5, 2017

(54) STATIONARY LEAD BATTERY PERFORMANCE IMPROVEMENT METHOD

(71) Applicant: K-Tec Engineering, Inc., Noda, Chiba (JP)

(72) Inventor: Kiichi Ito, Chiba (JP)

(73) Assignee: K-Tec Engineering, Inc. (JP)

(*) Notice: Subject to any disclaimer, the term of this patent is extended or adjusted under 35 U.S.C. 154(b) by 6 days.

(21) Appl. No.: 14/771,604

(22) PCT Filed: Mar. 12, 2014

(86) PCT No.: PCT/JP2014/056414  
§ 371 (c)(1),  
(2) Date: Aug. 31, 2015

(87) PCT Pub. No.: WO2014/142145  
PCT Pub. Date: Sep. 18, 2014

(65) Prior Publication Data  
US 2016/0006015 A1    Jan. 7, 2016

(30) Foreign Application Priority Data  
Mar. 12, 2013    (JP) ................................ 2013-049533

(51) Int. Cl.  
*H01M 10/06* (2006.01)  
*H01M 2/36* (2006.01)  
*H01M 10/42* (2006.01)  
*H01M 10/48* (2006.01)

(52) U.S. Cl.  
CPC .......... *H01M 2/362* (2013.01); *H01M 10/06* (2013.01); *H01M 10/4207* (2013.01); *H01M 10/4242* (2013.01); *H01M 10/482* (2013.01); *H01M 10/484* (2013.01); *H01M 2220/10* (2013.01); *H01M 2220/20* (2013.01)

(58) Field of Classification Search  
CPC .............................. H01M 10/06; H01M 10/20  
See application file for complete search history.

(56) References Cited

U.S. PATENT DOCUMENTS 1,402,631 A * 1/1922 Martin .................... H01M 4/23  
148/243

FOREIGN PATENT DOCUMENTS

| CA | 2413707 | * | 6/2004 |
|----|---------|---|--------|
| JP | H05-043466 | | 2/1993 |
| JP | H05-053127 | | 3/1993 |

(Continued)

*Primary Examiner* — Olatunji Godo  
(74) *Attorney, Agent, or Firm* — Harness, Dickey & Pierce, P.L.C.

(57) ABSTRACT

The present invention improves the performance of each lead battery, and simultaneously to establish overall balance, by inspecting the degradation state of each lead battery and performing the most suitable treatment while maintaining a state in which lead batteries are energized. This performance improvement method is for stationary lead batteries configuring a battery assembly which connects the terminals of the multiple lead batteries by means of a conducting plate, and involves a step for performing checks for inspection operations of the lead batteries, a step for measuring the internal electrical conductivity of each lead battery with the lead batteries still being in a normal use state, and a step for adding an electrolyte and purified water according to the state of each of the lead battery.

2 Claims, 6 Drawing Sheets

(56) References Cited

FOREIGN PATENT DOCUMENTS

| | | | |
|---|---|---|---|
| JP | H05-205710 | A | 8/1993 |
| JP | H06-111857 | A | 4/1994 |
| JP | H08-007916 | A | 1/1996 |
| JP | H08-203567 | A | 8/1996 |
| JP | H09-045379 | A | 2/1997 |
| JP | H09-092262 | A | 4/1997 |
| JP | 2000-040537 | A | 2/2000 |
| JP | 2000-048787 | A | 2/2000 |
| JP | 2000-353549 | A | 12/2000 |
| JP | 2001-118611 | A | 4/2001 |
| JP | 2002-289161 | A | 10/2002 |
| JP | 2002-542576 | A | 12/2002 |
| JP | 2003-121516 | A | 4/2003 |
| JP | 2003-243041 | A | 8/2003 |
| JP | 2004-134139 | A | 4/2004 |
| JP | 2004-152522 | A | 5/2004 |
| JP | 2006-244973 | A | 9/2006 |
| JP | 2007-213843 | A | 8/2007 |
| JP | 2008-071491 | A | 3/2008 |
| JP | 2011-008963 | A | 1/2011 |
| JP | 2011-146222 | A | 7/2011 |
| JP | 2011-171007 | A | 9/2011 |
| JP | 2013-026128 | A | 2/2013 |

\* cited by examiner

STATIONARY LEAD BATTERY PERFORMANCE IMPROVEMENT METHOD

CROSS-REFERENCE TO RELATED APPLICATIONS

This application is a 371 U.S. National Stage Application of International Application No. PCT/JP2014/056414, filed on Mar. 12, 2014, and published in Japanese as WO 2014/142145 A1 on Sep. 18, 2014. This application claims priority to Japanese Application No. 2013-049533, filed on Mar. 12, 2013. The entire disclosures of the above applications are incorporated herein by reference.

TECHNICAL FIELD

The present invention relates to a method for improving the performance of individual lead storage batteries in a stationary lead storage battery in which a plurality of lead storage batteries are connected in series, and, in particular, to a method for improving the performance of individual lead storage batteries to extend service life without using a pulsed current.

BACKGROUND ART

It has long been concerned that lead storage batteries may fail to function as they deteriorate, fail to play their role for emergencies etc., and therefore fail to function in earthquake disasters, other disasters, or any other emergencies, when electricity is needed, and that this may lead to accidents.

The deterioration of lead storage batteries is 80% attributable to sulfation, which covers lead polar plates and reduces the current carrying capacity. Other reasons may include physical damage, expansion due to overcurrent, over discharge as a result of batteries having been left unattended, and electrolyte shortage.

In response to this, a method has been proposed for removing sulfation, or the substance causing deterioration, by applying a pulsed current to the lead storage battery, as shown in Japanese Patent Application Laid-Open No. 2007-213843.

The invention of Japanese Patent Application Laid-Open No. 2007-213843 is an apparatus for removing sulfation precipitated on the polar plates of each of a plurality of batteries by applying a pulsed current supplied from a power source to each battery, and the apparatus includes a current switching means that supplies the current applied to each battery in the form of a pulsed current by alternately switching the application of a current to each of the batteries at a predetermined cycle, and a control means that controls the switching operation performed by the current switching means, whereby applying a pulsed current to both of the batteries on the side where the application of a current is terminated and the batteries on the side where the application of a current is started.

SUMMARY OF THE INVENTION

Problems to be Solved by the Invention

Although the invention of Japanese Patent Application Laid-Open No. 2007-213843 removes sulfation by applying a pulsed current to a lead storage battery, as the lead storage battery is formed from a battery assembly, it is unclear whether the state of each lead storage battery is improved even if a pulsed current is applied to the battery assembly as a whole.

In addition, to apply a pulsed current, the cables are disconnected, which means electricity needs to be cut off once. This raises concerns about the resetting of other pieces of equipment in the facility; the capacity of a standby lead storage battery to be used while the pulsed current is applied; and measures to take in the event of a power failure.

It is troublesome to reconnect the cables to the battery with electricity still being cut off, after completion of the pulse charging. Concerns about resetting and the measures to take in the event of a power failure still remain. Furthermore, when the battery deterioration is caused by, for example, electrolyte shortage, not only applying a current but also preventing electrolyte shortage is required.

To solve these problems, the present invention seeks to improve the performance of individual lead storage batteries and simultaneously attaining an overall balance by inspecting the deterioration states of individual lead storage batteries while maintaining supply of a current to the battery, and treating individual batteries with the optimum measures.

Means for Solving the Problem

A first aspect of the present invention is a method for improving the performance of a stationary lead storage battery consisting of an assembly of a plurality of lead storage batteries whose terminals are connected via conductive plates, and the method includes the steps of performing preliminary checks for inspection operations of the lead storage batteries, measuring the internal electrical conductivity of the individual lead storage batteries while under normal use of the battery, and adding an electrolyte and purified water in the form of mist based on the states of individual lead storage batteries.

A second aspect of the invention is a method for improving the performance of a stationary lead storage battery consisting of an assembly of a plurality of lead storage batteries whose terminals are connected via conductive plates, and the method includes the steps of performing preliminary checks for inspection of the individual lead storage batteries, measuring the internal electrical conductivity of the individual lead storage batteries while under normal use of the battery, adding an electrolyte and purified water in the form of mist based on the states of individual lead storage batteries, and further adding an electrolyte and purified water in the form of liquid based on the states of individual lead storage batteries.

Effect of the Invention

The method for improving the performance of a stationary lead storage battery according to the first aspect of the invention achieves the following effects:

(1) It is possible to avoid accidents in the event of a power failure, because the performance of a stationary lead storage battery can be inspected on site during normal use of the battery, and the battery is treated with improving measures.

(2) It is possible to attain an overall balance of the lead storage battery since the treatment to extend service life is conducted based on the states of individual lead storage batteries to enhance their performance.

(3) It is possible to reduce the time and cost for, for example, resetting of equipment because the entire operation from inspection to treatment is conducted without cutting off the electricity at all.

(4) It is possible to reduce $CO_2$ emission because no excess electricity is used.

(5) It is possible to reduce $CO_2$ emission as well as costs for producing new batteries and disposing depleted batteries and for transportation.

(6) Because the electrolyte and purified water are supplied in the form of mist, it is advantageous that the operations can be conducted without decreasing the current voltage.

According to the method for improving the performance of a stationary lead storage battery of the second aspect of the invention, because the electrolyte and purified water are used in the form of mist, it is advantageous that the operation can be performed without decreasing the current voltage.

After the addition of the electrolyte and purified water in the form of mist, it is also possible to treat severely deteriorated lead storage batteries further by adding a liquid containing the electrolyte and purified water, after a given time, as appropriate.

MODE FOR CARRYING OUT THE INVENTION

Figure 1:
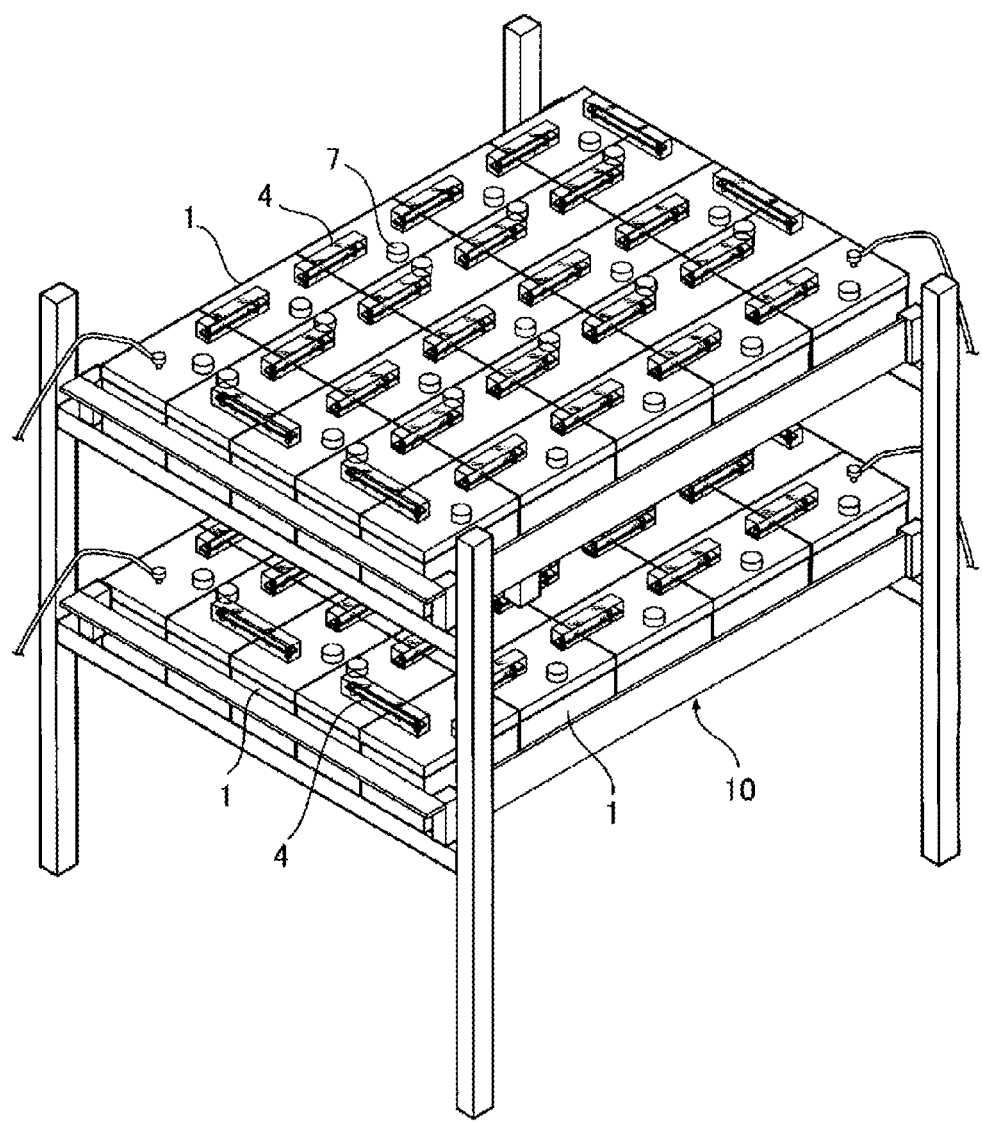
FIG. 1 is a perspective view of a stationary lead storage battery according to an embodiment of the present invention
Figure 2:
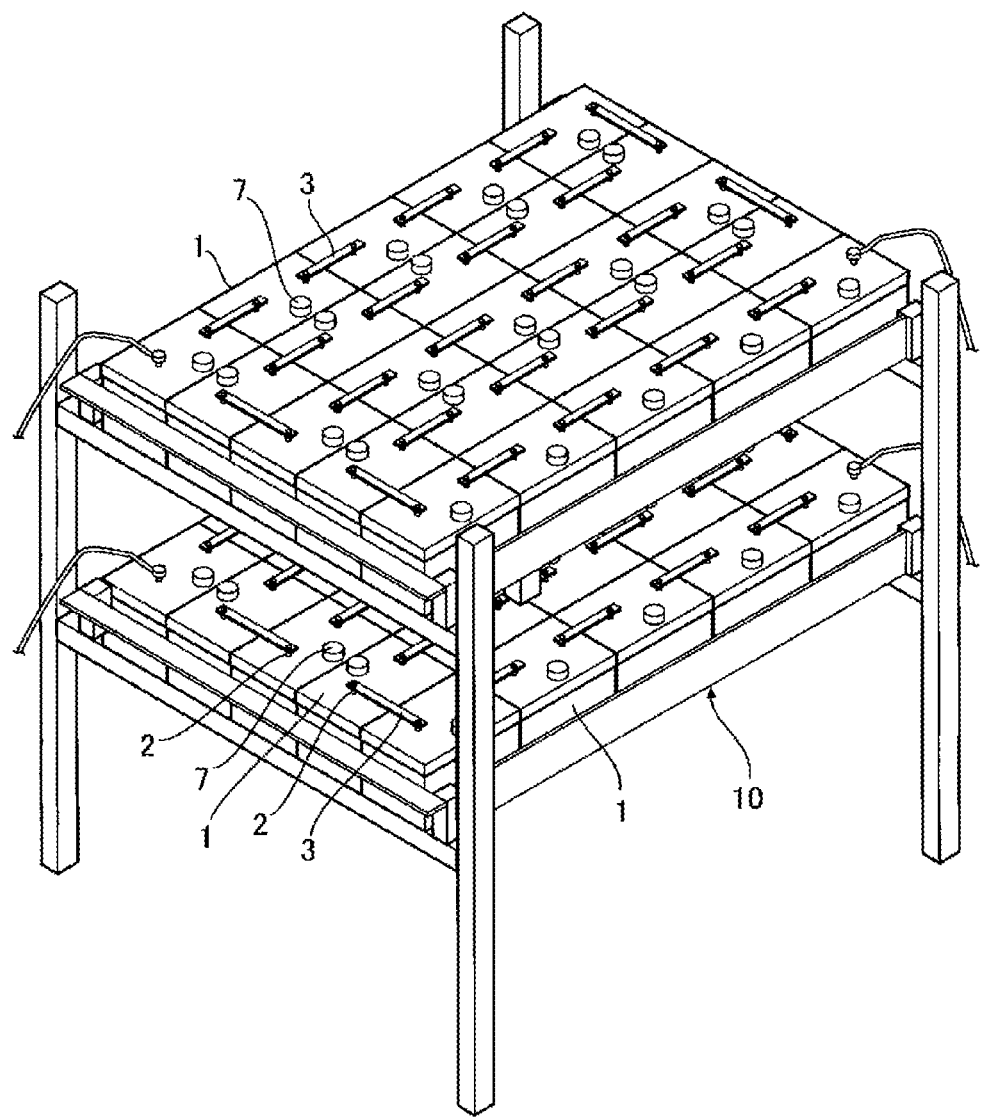
FIG. 2 is an illustrative view showing an embodiment of the present invention.

Although embodiments of the invention are described in the context of a valve-regulated stationary lead-acid storage battery, the application of the present invention is not limited to such batteries.

The stationary lead storage battery of the present embodiment include, as shown in the drawings, a plurality of lead storage batteries 1 connected in series and arranged on a rack 10. Terminals 2 of each lead storage battery 1 are each connected to the terminals 2 of an adjacent lead storage battery 1 with a conductive plate 3, which bring two terminals 2 of adjacent lead storage batteries 1 electrically connected. The surface of each conductive plate 3 is covered with a terminal cover 4.

Each lead storage battery 1 has an opening 6 on its surface for inspections of, for example, current and voltage values of the battery. The opening 6 is usually covered with a lid 7.

An embodiment of a method for improving the performance of a lead storage battery according to the present invention will be explained.

First, checking steps from Steps S1 to S4 are performed for the above-described stationary lead storage battery during normal use to prepare the operational environment: (Step S1) check the overall arrangement of lead storage batteries 1; (Step S2) check cable arrangement; (Step S3) check arrangement panels; and (Step S4) check workspace for inspection operation.

Next, the state of current, such as overcurrent, is checked by measuring the current supplied through the cables that connect the main equipment body and the lead storage batteries 1 through the two lead storage batteries 1 located at the left and right ends on the top shelf of the rack in FIG. 1 using an ammeter (not shown) (Step S5).

Figure 3:
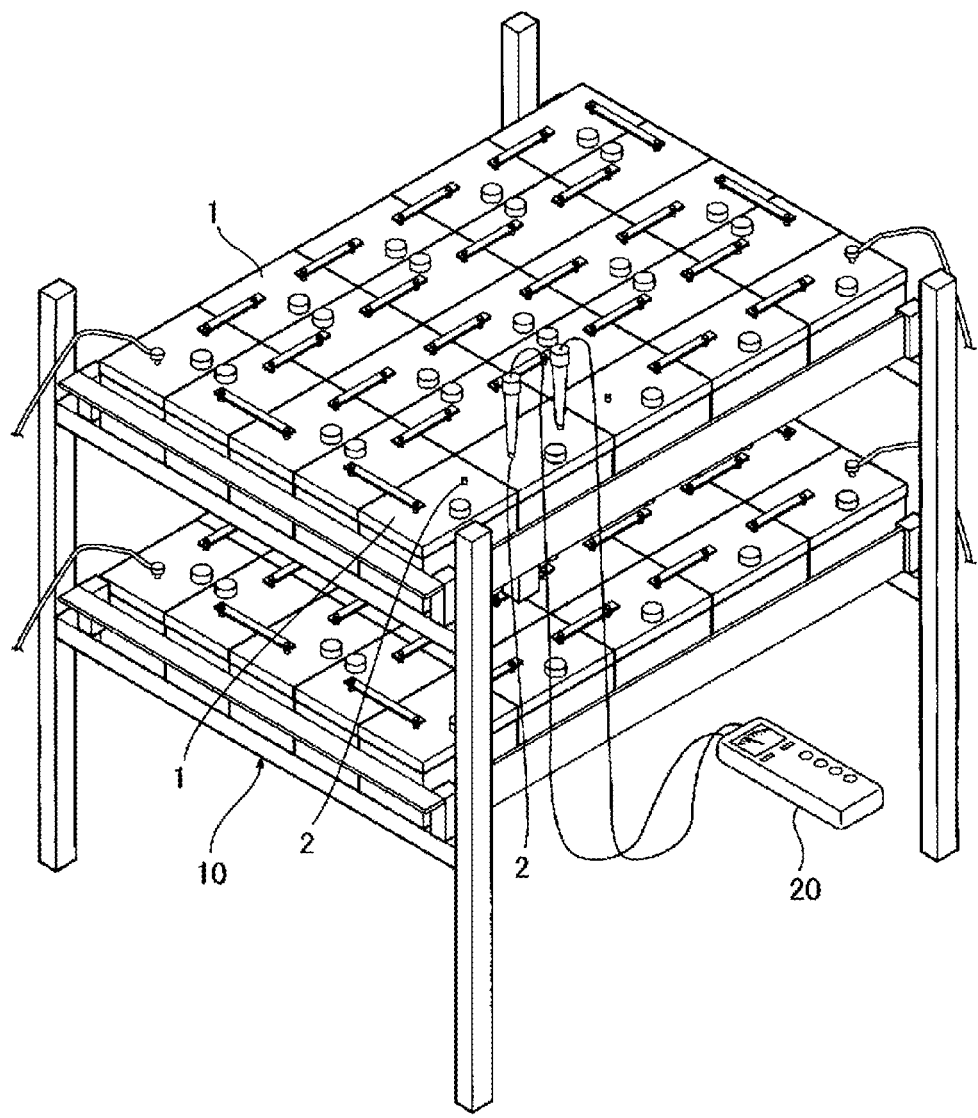
FIG. 3 is an illustrative view showing an embodiment of the present invention.

Next, as shown in FIG. 3, the internal electrical conductivity of the individual lead storage batteries 1 are checked using an appropriate conductance measuring device 20 (Step S6).

Specifically, the voltage and conductance value of cells in individual storage batteries 1 are measured using a conductance measuring device 20 while under normal use of the battery without cutting off the electricity.

Although a product with a trade name "MIDTRONICS Battery analyzer" (manufactured by MIDTRONICS Inc. in US) was used as the conductance measuring device 20 in the present embodiment, this is not limitative.

Figure 4:
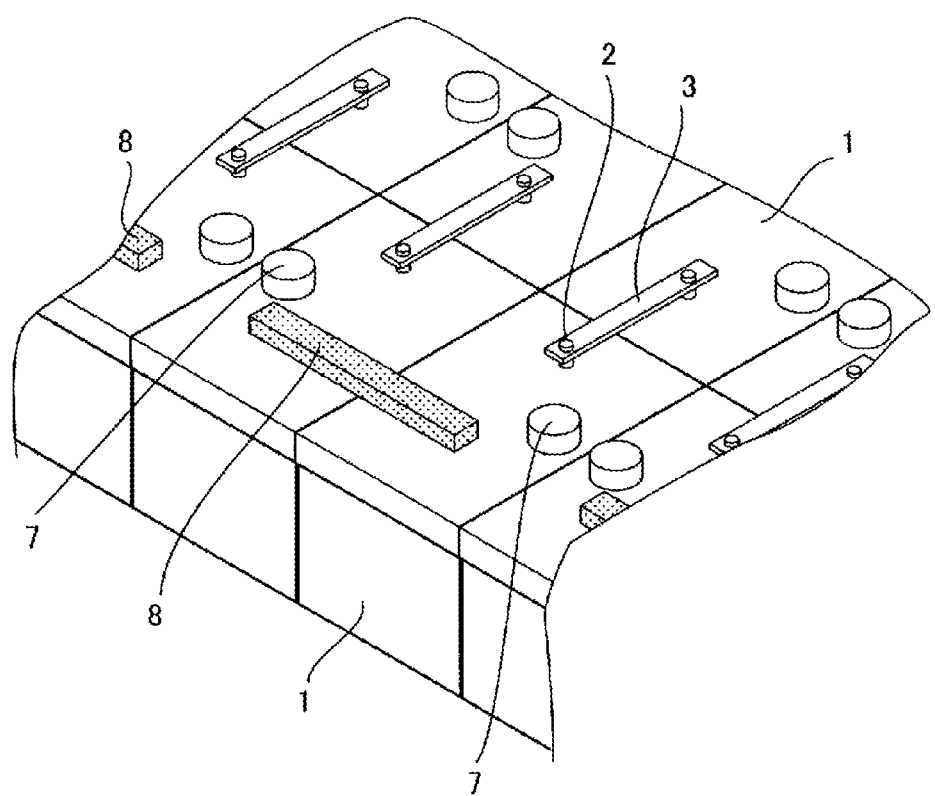
FIG. 4 is an illustrative view showing an embodiment of the present invention.
Figure 5:
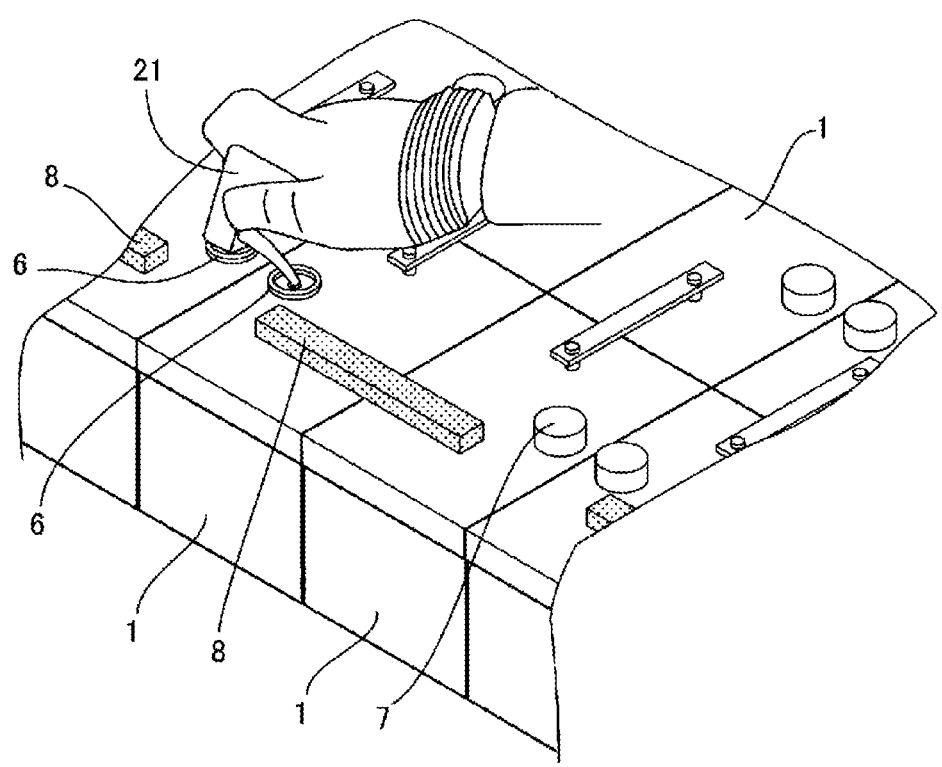
FIG. 5 is an illustrative view showing an embodiment of the present invention.
Figure 6:
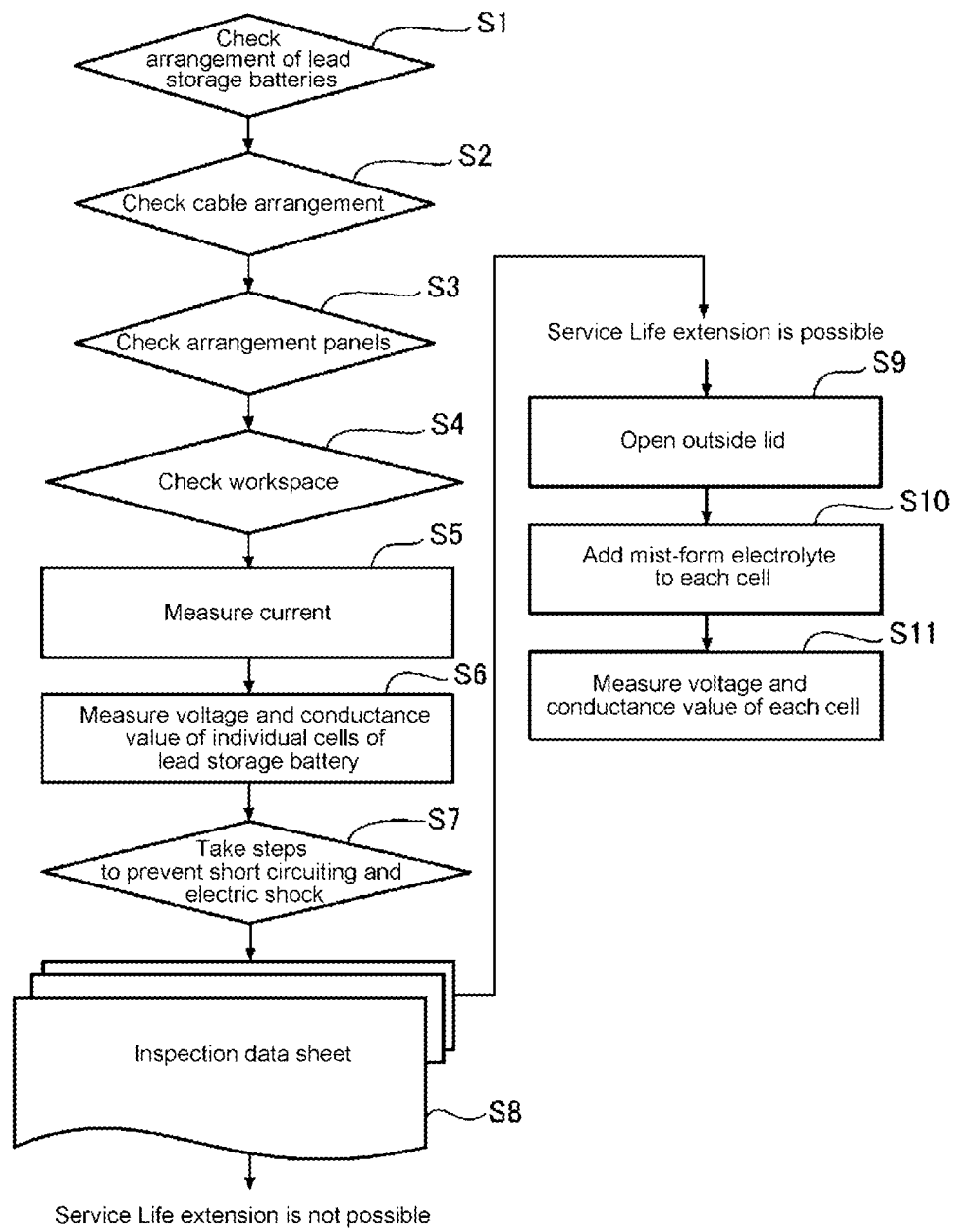
FIG. 6 is a flowchart illustrating an embodiment of the present invention.

Next, as shown in FIG. 4, an insulator 8 is placed over terminals 2 to prevent short circuiting and electric shock (Step S7).

Subsequently, an inspection data sheet summarizing the inspection results performed in each step is prepared (Step S8), and lead storage batteries for which life extension is determined to be not possible for reasons such as physical damage, expansion or dropping of polar plates, are replaced. Meanwhile, lead storage batteries for which life extension is determined to be possible, although performance is currently low because of deterioration due to sulfation or electrolyte shortage, are treated with performance improving measures.

Extension of service life is determined to be possible if a lead storage battery has 60% or more, as a reference value, of the performance of a new battery, and performance improving measures will be taken for such lead storage batteries.

Next, the outside lid 7 of the opening 6 is opened with a predetermined tool (Step S9), and an electrolyte and purified water are added to cells in an individual lead storage battery 1, using a mister 21, based on the states of individual lead storage batteries 1 (Step S10).

In this case, the electrolyte is provided in the form of mist so that it adheres to polar plates. This operation is performed while maintaining the current voltage. Because the states of individual lead storage batteries 1 vary, the amount may be increased for severely deteriorated lead storage batteries. In addition, because the electrolyte adheres in the form of mist, no liquid leakage occurs even when the batteries are placed on their sides or upside down after the electrolyte has been added.

In this manner, the electrolyte and purified water are added depending on the individual difference of the lead storage batteries to remove sulfation, enhance conductivity, and prevent electrolyte shortage so as to enhance the performance.

Although the mixing ratio of the electrolyte to purified water is 1 to 9 in volume ratio in the present embodiment, this is not limitative. A product with a trade name "Battery Equalizer" (manufactured by Battery Equalizer USA, LLC) was used as the electrolyte. The electrolytes by this manufacturer are markedly effective in enhancing the conductivity of lead storage batteries, removing sulfation, and coating polar plates to extend the service life of lead storage batteries. The electrolyte is not limited to the above-described electrolyte, and any suitable electrolyte may be used.

Furthermore, in Step S9, the outside lids of some lead storage batteries are configured to be unopenable. In that case, an opening may be formed at an appropriate location in each lead battery, through which the electrolyte and purified water are added, and the opening is sealed thereafter.

If the performance of a lead storage battery 1 is not significantly improved by the addition of an electrolyte and purified water in the form of mist, additional electrolyte may be provided. In that case, this additional step is provided subsequent to Step S10.

After a series of the above-described improvement operations, the voltage and conductance value of individual lead storage batteries 1 are measured (Step S11). Because the lead storage batteries 1 have individual differences, treating them based on the states of individual batteries 1 can attain an overall balance.

Any damage to the exterior layer of individual lead storage batteries or damage to the terminals, for example, may also be repaired.

As described above, according to the present embodiment, the initial inspection operation to the final measurement operation can be performed without cutting off the electricity at all, so that the battery works without any problems in the event of a power failure and the operations can be done under normal use of the battery.

The present invention may be applied to general industrial storage batteries including: lead storage batteries for communication facilities; stationary lead storage batteries for emergencies at communication base stations; buildings; facilities; stationary lead storage batteries for emergencies located inside or outside of buildings; valve-regulated stationary lead storage batteries; valve-regulated lead storage batteries; vented stationary lead storage batteries; stationary lead storage batteries for solar panels etc.; lead storage batteries for electric automobiles; lead storage batteries for control power source for vehicles; lead storage batteries for firefighting equipment; UPS; CATV; lead storage batteries for private power generation; lead storage batteries for receiving and transforming facility operations; lead storage batteries for emergency lighting; standbys for measuring instrumentations; lead storage batteries for control instruments; lead storage batteries for disaster and crime prevention; lead storage batteries for railway crossing signal/alarm system; and lead storage batteries for telephone line switching equipment.

The invention claimed is:

1. A method for improving performance of a stationary lead storage battery which outputs electric power, the stationary lead storage battery including a plurality of lead storage batteries, each of the plurality of lead storage batteries having a body and a terminal provided at an outer surface of the body, the terminals of adjacent ones of the plurality of lead storage batteries being respectively interconnected by conductive plates, the method comprising:

performing a preliminary check of the plurality of lead storage batteries, the preliminary check determining whether the plurality of lead storage batteries are in a suitable condition for an inspection operation, the preliminary check being performed during normal use of the stationary lead storage battery without cutting off the electric power;

performing the inspection operation by measuring an internal electrical conductivity of each of the plurality of lead storage batteries during the normal use of the stationary lead storage battery without cutting off the electric power; and adding a mist of an electrolyte and purified water to cells of select lead storage batteries of the plurality of lead storage batteries based on the internal electrical conductivity measured of each of the plurality of lead storage batteries during the normal use of the stationary lead storage battery without cutting off the electric power.

2. A method for improving performance of a stationary lead storage battery which outputs an electric power, the stationary lead storage battery including a plurality of lead storage batteries, each of the plurality of lead storage batteries having a body and a terminal provided at an outer surface of the body, the terminals of adjacent ones of the plurality of lead storage batteries being respectively interconnected by conductive plates, the method comprising:

performing a preliminary check of the plurality of lead storage batteries, the preliminary check determining whether the plurality of lead storage batteries are in a suitable condition for an inspection operation, the preliminary check being performed during normal use of the stationary lead storage battery without cutting off the electric power;

performing the inspection operation by measuring an internal electrical conductivity of each of the plurality of lead storage batteries during the normal use of the stationary lead storage battery without cutting off the electric power; and adding a mist including an electrolyte and purified water to cells of select lead storage batteries of the plurality of lead storage batteries based on the internal electrical conductivity measured of each of the plurality of lead storage batteries during the normal use of the stationary lead storage battery without cutting off the electric power, and further adding a liquid including the electrolyte and the purified water to desired ones of the cells based on the internal electrical conductivity measured of each of the plurality of lead storage batteries during the normal use of the stationary lead storage battery without cutting off the electric power.

* * * * *